US011435945B2

United States Patent
Yamazaki et al.

(10) Patent No.: US 11,435,945 B2
(45) Date of Patent: Sep. 6, 2022

(54) MEMORY APPARATUS AND CONTROL METHOD FOR COMMAND QUEUE BASED ALLOCATION AND MANAGEMENT OF FIFO MEMORIES

(71) Applicant: Kioxia Corporation, Tokyo (JP)

(72) Inventors: Hajime Yamazaki, Kanagawa (JP); Mitsunori Tadokoro, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 37 days.

(21) Appl. No.: 16/559,515

(22) Filed: Sep. 3, 2019

(65) Prior Publication Data

US 2020/0301613 A1 Sep. 24, 2020

(30) Foreign Application Priority Data

Mar. 20, 2019 (JP) .............................. JP2019-053452

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0613* (2013.01); *G06F 3/0679* (2013.01); *G06F 12/0246* (2013.01); *G06F 2212/7201* (2013.01)

(58) Field of Classification Search
CPC .. G06F 3/0659; G06F 3/0613; G06F 12/0246; G06F 3/0679; G06F 2212/7201
See application file for complete search history.

(56) References Cited

U.S. PATENT DOCUMENTS

| | | | |
|---|---|---|---|
| 8,255,618 B1* | 8/2012 | Borchers | G06F 13/1642 711/103 |
| 2008/0235466 A1* | 9/2008 | Traister | G11C 16/10 711/154 |
| 2010/0146163 A1* | 6/2010 | Son | G06F 12/123 710/54 |
| 2010/0262761 A1* | 10/2010 | Borchers | G06F 3/0679 711/103 |
| 2011/0078365 A1* | 3/2011 | Lin | G06F 3/061 711/103 |
| 2016/0103625 A1 | 4/2016 | Fujimoto | |
| 2016/0162186 A1* | 6/2016 | Kashyap | G06F 12/0246 711/103 |
| 2018/0101319 A1* | 4/2018 | Zhou | G06F 3/0631 |

(Continued)

FOREIGN PATENT DOCUMENTS

JP 2015-026358 A 2/2015

*Primary Examiner* — Arvind Talukdar
(74) *Attorney, Agent, or Firm* — Foley & Lardner LLP (57) ABSTRACT

According to one embodiment, a memory apparatus includes a memory device and a controller. The memory device includes a plurality of memory chips. The controller includes a plurality of memories. The controller determines whether or not the memory chip is allocated to any one memory when receiving an access request related to the memory chip from a host apparatus. The controller newly allocates the memory chip to the memory to which none of the memory chips is allocated when it is determined that the memory chips is not allocated, and enqueues a command corresponding to the access request received from the host apparatus to the memory to which the memory chip is newly allocated.

20 Claims, 6 Drawing Sheets

(56) References Cited

U.S. PATENT DOCUMENTS

2018/0307521 A1\* 10/2018 Pinto ...................... G06F 9/546
2019/0278518 A1\* 9/2019 Byun .................... G06F 3/0631
2019/0286364 A1\* 9/2019 Gavens ................ G06F 3/0659
2019/0294339 A1\* 9/2019 Bolkhovitin ........ G06F 12/1072

\* cited by examiner

| QUEUE NUMBER | CHIP NUMBER |
|---|---|
| QUEUE 0 | CHIP 0 |
| QUEUE 1 | CHIP 7 |
| QUEUE 2 | NON-ALLOCATION |
| ⋮ | ⋮ |
| QUEUE 62 | NON-ALLOCATION |
| QUEUE 63 | NON-ALLOCATION |

*FIG. 6B*

| QUEUE NUMBER | CHIP NUMBER |
|---|---|
| QUEUE 0 | CHIP 0 |
| QUEUE 1 | CHIP 7 |
| QUEUE 2 | CHIP 5 |
| ⋮ | ⋮ |
| QUEUE 62 | NON-ALLOCATION |
| QUEUE 63 | NON-ALLOCATION |

*FIG. 6C*

| QUEUE NUMBER | CHIP NUMBER |
|---|---|
| QUEUE 0 | CHIP 0 |
| QUEUE 1 | CHIP 7 |
| QUEUE 2 | NON-ALLOCATION |
| ⋮ | ⋮ |
| QUEUE 62 | NON-ALLOCATION |
| QUEUE 63 | NON-ALLOCATION |

*FIG. 7A*
PROBABILITY OF OCCURRENCE OF REQUEST WITH RESPECT TO COMMAND QUEUE (QD=64, M=64 N=256)

*FIG. 7B*
PROBABILITY OF OCCURRENCE OF REQUEST WITH RESPECT TO COMMAND QUEUE (QD=64, M=64 N=256)

MEMORY APPARATUS AND CONTROL METHOD FOR COMMAND QUEUE BASED ALLOCATION AND MANAGEMENT OF FIFO MEMORIES

CROSS-REFERENCE TO RELATED APPLICATIONS

This application claims the benefit of and priority to Japanese Patent Application No. 2019-053452, filed Mar. 20, 2019, the entire contents of which are incorporated herein by reference.

FIELD

Embodiments described herein relate generally to a memory apparatus and a control method thereof.

BACKGROUND

Some memory apparatuses use a NAND-type flash memory as a recording medium. A solid state drive (SSD) can be used a memory apparatus using such a type of NAND-type flash memory.

DETAILED DESCRIPTION

Embodiments described herein provide for a memory apparatus configured to achieve an improvement in an access throughput.

In general, according to one embodiment, a memory apparatus includes a memory device and a controller. The memory device includes a first memory chip and a second memory chip. The controller includes a first memory and a second memory. The controller is configured to: determine whether or not the first memory chip is allocated to either the first memory or the second memory when receiving an access request related to the first memory chip from a host apparatus; newly allocate the first memory chip to either the first memory or the second memory to which neither the first memory chip nor the second memory chip is allocated when it is determined that the first memory chip is not allocated as a result of the determination; and enqueue a command corresponding to the access request received from the host apparatus to either the first memory or the second memory to which the first memory chip is newly allocated.

Hereinafter, an embodiment of the present disclosure will be described with reference to the accompanying drawings.

[1] Configuration of Memory System

[1-1] Overall Configuration of Memory System

Figure 1:
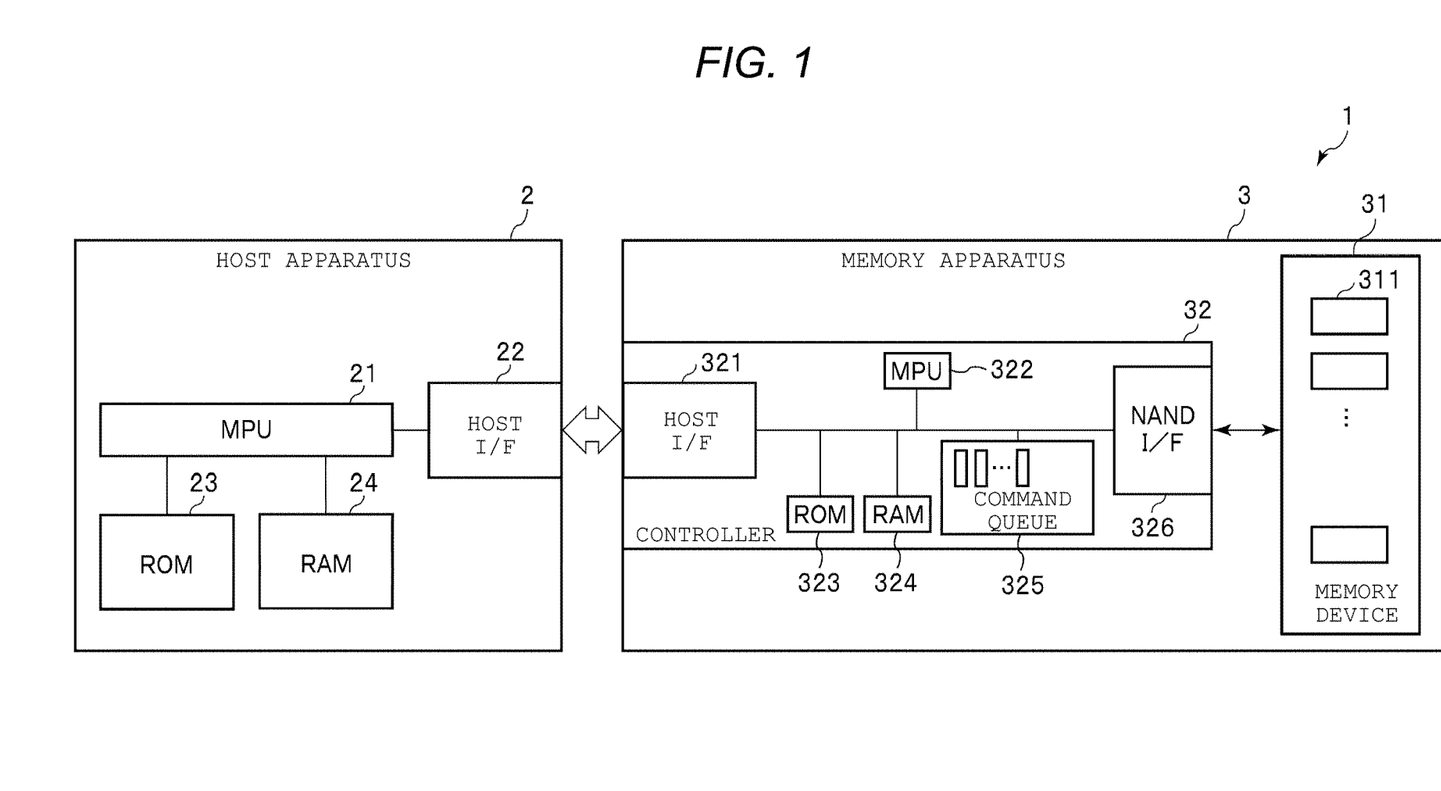
FIG. 1 is a diagram illustrating a configuration example of a memory system according to an embodiment of the present disclosure.

FIG. 1 is a block diagram illustrating a configuration example of the memory system according to an embodiment. A memory system 1 includes a host apparatus 2 and a memory apparatus 3. The host apparatus 2 and the memory apparatus 3 are capable of communicating with each other. The memory apparatus 3 performs writing, reading, and erasure of data in response to a request received from the host apparatus 2.

[1-2] Configuration of Host Apparatus 2

As illustrated in FIG. 1, the host apparatus 2 includes a micro processing unit (MPU) 21, a host interface circuit (I/F) 22, a read only memory (ROM) 23, and a random access memory (RAM) 24. The host apparatus 2 is a general apparatus that writes data in the memory apparatus 3 and reads data from the memory apparatus 3 and is not limited to a specific apparatus. Here, the host apparatus 2 of the embodiment may issue a plurality of commands in parallel to the memory apparatus 3. The host apparatus 2 may include components other than the components illustrated in FIG. 1.

The MPU 21 is a processing apparatus that controls the overall operation of the host apparatus 2. When the host apparatus 2 is supplied with power, firmware stored in the ROM 23 is read onto the RAM 24. The MPU 21 executes a predetermined process in accordance with the firmware. In addition, the MPU 21 executes various functions in accordance with programs stored in the ROM 23 and the RAM 24.

The host interface circuit 22 is a hardware interface that performs communication between the host apparatus 2 and the outside. The host interface circuit 22 is operated according to predetermined arrangement used for communication between the host apparatus 2 and the outside.

The ROM 23 is a read-only semiconductor storage apparatus. The ROM 23 stores firmware executed by the MPU 21 and various programs. Instead of the ROM 23 or in addition to the ROM 23, a storage device, such as a hard disk, may be used on which general writing can be performed.

The RAM 24 is a semiconductor storage apparatus on which writing can be freely performed. The RAM 24 is used as a work area of the MPU 12 and temporarily stores firmware stored in the ROM 23, and the like.

[1-2] Configuration of Memory Apparatus 3

The memory apparatus 3 is, for example, an SSD. The memory apparatus 3 of the embodiment may process a plurality of commands, which are issued in parallel from the host apparatus 2, in parallel. As illustrated in FIG. 1, the memory apparatus 3 includes a memory device 31 and a controller 32.

The memory device 31 includes a plurality of memory chips 311. Each of the memory chips includes a NAND-type flash memory and has a specific chip number (or other specific identifier). The NAND-type flash memory stores data in a non-volatile manner. The NAND-type flash memory writes and reads data in units called pages each including a plurality of memory cells. A specific physical address is allocated to each page. Further, the NAND-type flash memory device 31 erases data in units called blocks each including a plurality of pages. Meanwhile, the physical addresses may be allocated in units of blocks.

The controller 32 is a control apparatus that controls the memory device 31. The controller 32 commands the memory device 31 to write, read, and erase data in response to a request received from the host apparatus 2. In addition, the controller 32 manages the state of reception of commands of the individual memory chips 311 on the basis of command queues. That is, the controller receives ready and busy signals from the memory chips in the memory device 31 and manages whether each of the memory chips is in a ready state (a command receivable state) or a busy state (a command unreceivable state).

As illustrated in FIG. 1, the controller 32 includes a host interface circuit 321, a MPU 322, a ROM 323, a RAM 324, a command queue 325, and a NAND interface circuit (I/F) 326.

The host interface circuit 321 is a hardware interface for performing communication between the memory apparatus 3 and the host apparatus 2. More specifically, the host interface circuit 321 controls transmission and reception of various commands and data to and from the host interface circuit 22 of the host apparatus 2.

The MPU 322 is a processing apparatus that controls the overall operation of the memory device 31. When the memory apparatus 3 is supplied with power, firmware stored in the ROM 323 is read onto the RAM 324. The MPU 322 executes a predetermined process in accordance with this firmware. The MPU 322 creates various tables on the RAM 324 in accordance with firmware or executes a predetermined process for the memory device 31 in response to a command received from the host apparatus 2. For example, a table includes a look-up table for converting a logical address requested from the host apparatus 2 into a physical address on the memory chip 311 corresponding to the logical address.

The ROM 323 is a read-only semiconductor storage apparatus. The ROM 323 stores firmware controlled by the MPU 322, and the like.

The RAM 324 is a semiconductor storage apparatus on which writing can be freely performed. The RAM 324 is used as a work area of the MPU 322. In addition, the RAM 324 temporarily stores firmware stored in the ROM 323 and a database created by the MPU 322. In addition, the RAM 324 may temporarily store data for managing a command queue allocation state. The command queue allocation state in the embodiment indicates whether or not a chip number for a command queue is allocated. A command queue for which a chip number is allocated is used in order to queue commands related to the memory chip 311 of the corresponding chip number.

The command queue 325 is a memory for queuing commands from the MPU 322. The command queue 325 is, for example, a first-in first-out (FIFO) memory. A plurality of command queues 325 are provided, each of which has a specific queue number (or other specific identifier). For example, the number of command queues 325 is the same as the number of commands capable of being simultaneously issued in the host apparatus 2. The MPU 322 stores a command from the host in the command queue 325 corresponding to an address designated from the host (referred to herein as being enqueued). The command stored in the command queue 325 is executed in order of storage. The executed command is taken out from the command queue 325 (referred to herein as being dequeued). The NAND interface circuit 326 performs writing, reading, and erasure of data on the memory chip 311 of a chip number designated in accordance with a command on the basis of the dequeued command. A plurality of commands related to the same chip number may be stored in the command queue 325.

The NAND interface circuit 326 is a hardware interface that performs an interface process for transmitting and receiving commands and data between the controller 32 and the memory device 31.

[2] Operation of Memory System

Figure 2:
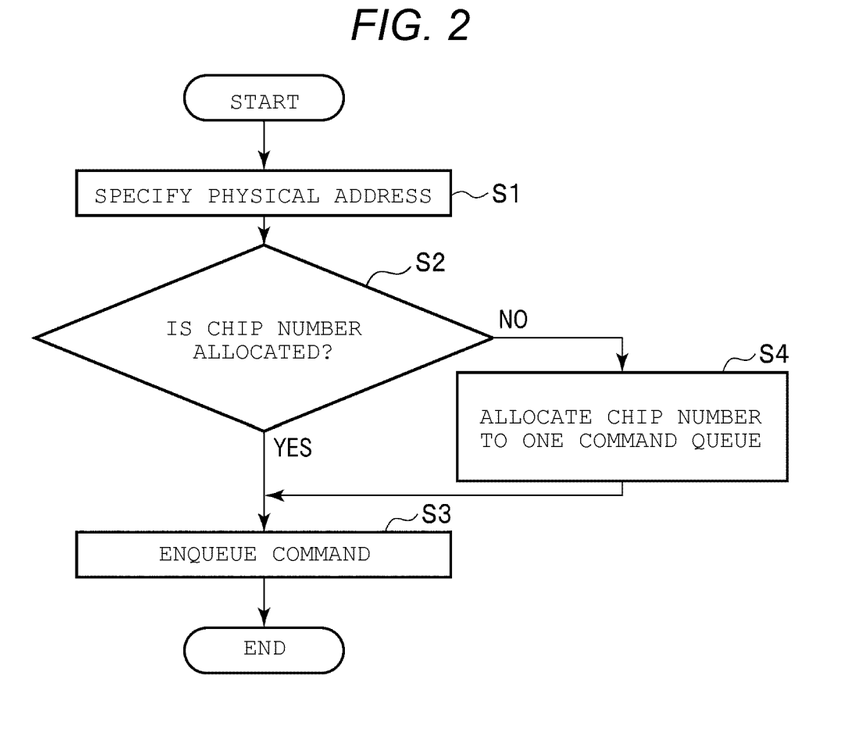
FIG. 2 is a flowchart illustrating a command process according to an embodiment of the present disclosure.

FIG. 2 is a flowchart illustrating a command process according to the embodiment. When a command is received, the MPU 322 specifies a physical address on the memory device 31 corresponding to a logical address designated in accordance with a received command with reference to a look-up table created in the RAM 324 in step S1.

In step S2, the MPU 322 determines whether or not a chip number corresponding to the physical address specified in step S1 is allocated. The MPU 322 performs the determination of step S2 on the basis of data in a command queue allocation state. The data in a command queue allocation state is stored in, for example, the RAM 324. When it is determined in step S2 that a chip number corresponding to the physical address specified in step S1 is allocated (S2 YES), the process proceeds to step S3. When it is determined in step S2 that a chip number corresponding to the physical address specified in step S1 is not allocated (S2 NO), the process proceeds to step S4.

Figure 3:
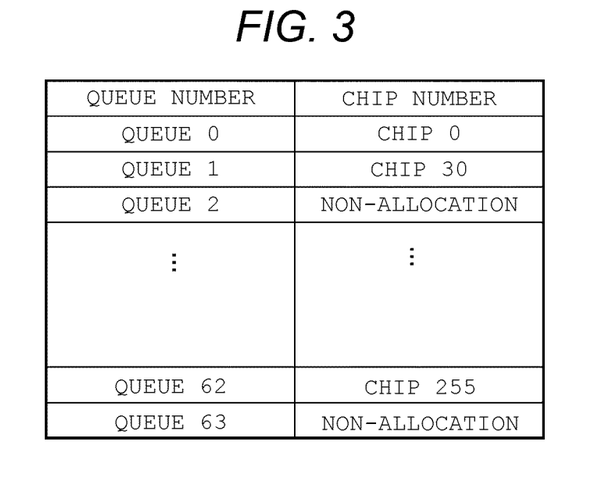
FIG. 3 illustrates an example of data for managing allocation in a command queue allocation state according to an embodiment of the present disclosure.

FIG. 3 illustrates an example of data in a command queue allocation state. In the example of FIG. 3, a command queue allocation state is managed in a queue-chip table. The queue-chip table manages a chip number allocation state for each command queue. The queue chip table stores a chip number allocated to a command queue. In addition, the queue-chip table stores information indicating non-allocation with respect to a command queue to which a chip number is not allocated.

In a case where there is a chip number corresponding to the physical address specified in step S1, the MPU 322 determines that the chip number corresponding to the physical address specified in step S1 is allocated, for example, with reference to the queue-chip table illustrated in FIG. 3.

In step S3, the MPU 322 enqueues a command to a command queue to which the chip number corresponding to the physical address specified in step S1 is allocated. Thereafter, the MPU 322 terminates the process.

In step S4, the MPU 322 allocates a chip number of a memory chip corresponding to the physical address specified in step S1 to one of the command queues to which a chip number is not allocated. In this case, the MPU 322 also updates data in the command queue allocation state accordingly. Thereafter, the process proceeds to step S3.

Figure 4:
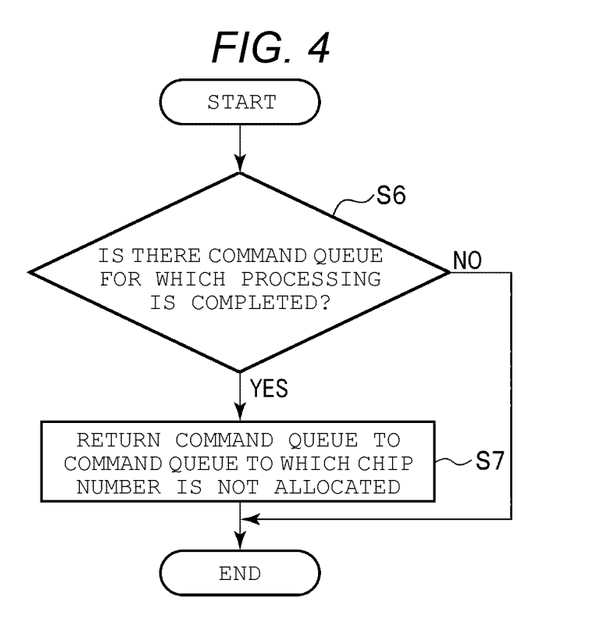
FIG. 4 is a flowchart illustrating an allocation cancellation operation of a chip number in an embodiment of the present disclosure.

FIG. 4 is a flowchart illustrating an allocation cancellation operation of a chip number in the embodiment.

In step S6, the MPU 322 determines whether or not there is a command queue for which processing is completed, that is, a command queue for which all commands are dequeued among dequeues for which allocation is performed (e.g., an empty or null command queue). In step S6, when it is determined that there is no command queue for which processing is completed, the process in FIG. 4 is terminated. In step S6, when it is determined that there is a command queue for which processing is completed, the process proceeds to step S7.

In step S7, the MPU 322 returns the command queue for which processing is completed to a command queue to which a chip number is not allocated. For example, the MPU 322 labels, tags, or identifies the command queue for which processing is completed as a command queue for which a chip number is not allocated. The MPU 322 may update data in the command queue allocation state which is stored in, for example, the RAM 324. Thereafter, the MPU 322 terminates the process (END).

Figure 5A:
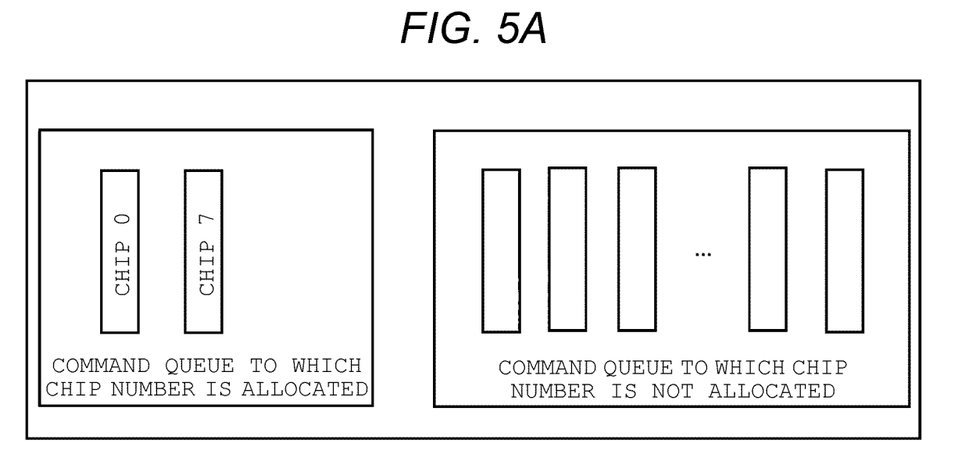
FIG. 5A is a diagram illustrating a specific example of an operation of a memory apparatus according to an embodiment of the present disclosure.
Figure 5B:
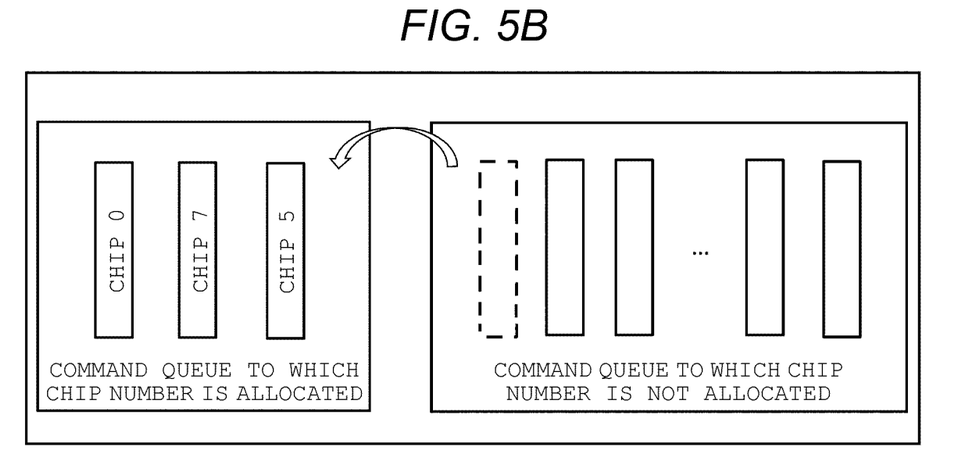
FIG. 5B is a diagram illustrating a specific example of an operation of the memory apparatus according to an embodiment of the present disclosure.
Figure 5C:
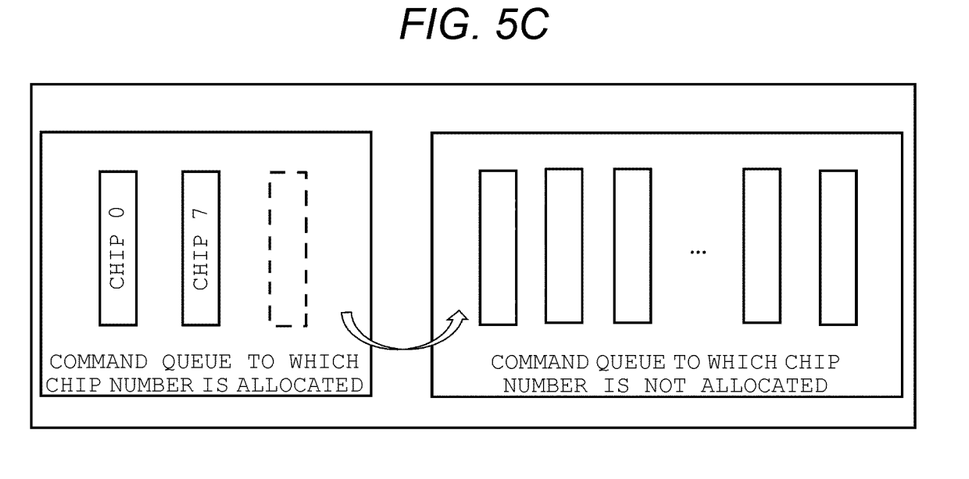
FIG. 5C is a diagram illustrating a specific example of an operation of the memory apparatus according to an embodiment of the present disclosure.
Figure 6A:
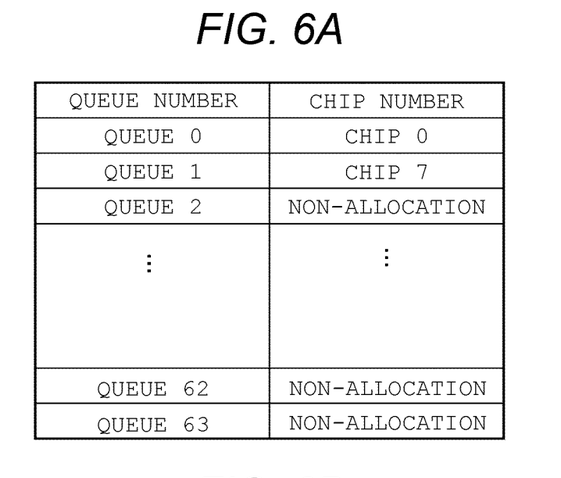
FIG. 6A is a diagram illustrating a queue-chip table corresponding to the operation in FIG. 5A.
Figure 6B:
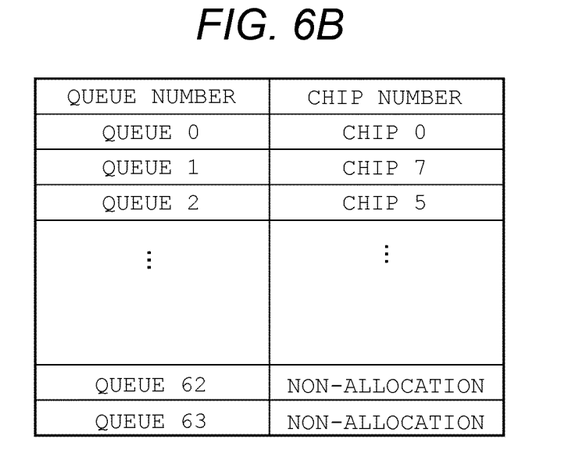
FIG. 6B is a diagram illustrating a queue-chip table corresponding to the operation in FIG. 5B.
Figure 6C:
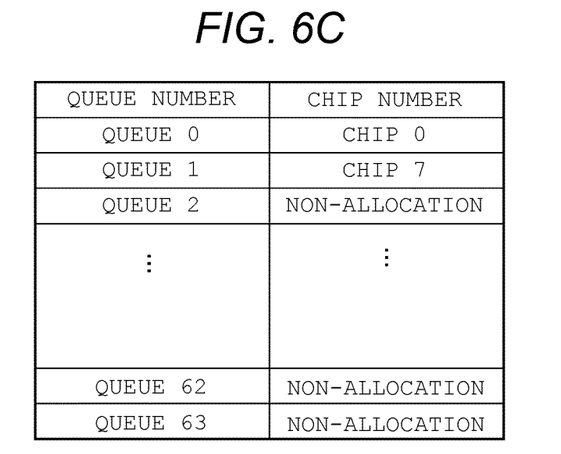
FIG. 6C is a diagram illustrating a queue-chip table corresponding to the operation in FIG. 5C.

Hereinafter, the processes in FIGS. 2 and 4 will be described using a specific example. FIGS. 5A to 5C are diagrams illustrating a specific example of an operation of the memory apparatus 3. In addition, FIGS. 6A to 6C are diagrams illustrating a queue-chip table corresponding to the operations in FIGS. 5A to 5C. Here, in the following example, it is assumed that the number of commands simultaneously issued from the host apparatus 2 ("QD") is 64 the number of command queues 325 ("M") is 64 (queue number 0 to queue number 63), and the number of memory chips 311 ("N") is 256 (chip number 0 to chip number 255).

At a point in time illustrated in FIG. 5A, only chip 0 and chip 7 are allocated to a command queue. Chip 5 is not allocated to a command queue. In this case, in the queue-chip table, as illustrated in FIG. 6A, for example, a chip number allocated to queue 0 is chip 0, a chip number allocated to queue 1 is chip 7, and chip numbers allocated to the other queue numbers are non-allocation.

Here, it is assumed that an address designated in accordance with a command received from the host apparatus 2 is associated with chip 5 (e.g., specifies a logical address corresponding to the physical address of chip 5). In this case, as illustrated in FIG. 5B, the MPU 322 allocates, for example, chip 5 to a command queue of a queue 2 among the non-allocation command queues. In addition, the MPU 322 enqueues the command to the command queue of queue 2. As illustrated in FIG. 6B, the MPU 322 updates, for example, the queue-chip table.

Thereafter, when all of the commands stored in the command queue of queue 2 are dequeued, the MPU 322 returns the command queue of queue 2 to non-allocation as illustrated in FIG. 5C. In addition, as illustrated in FIG. 6C, the MPU 322 updates the state of allocation of the queue 2 to non-allocation. The command queue returned to non-allocation may be used when a chip number is allocated again, similar to the other command queues of non-allocation.

As described above, according to the embodiment, a chip number is allocated to one of the command queues of non-allocation on demand instead of allocating a chip number to a command queue in advance. Thereby, an improvement in an access throughput in a memory apparatus is achieved.

A method of allocating a plurality of chip numbers to one command queue in advance can be used as a method for improving an access throughput in a memory apparatus according to an embodiment of the present disclosure.

Figure 7A:
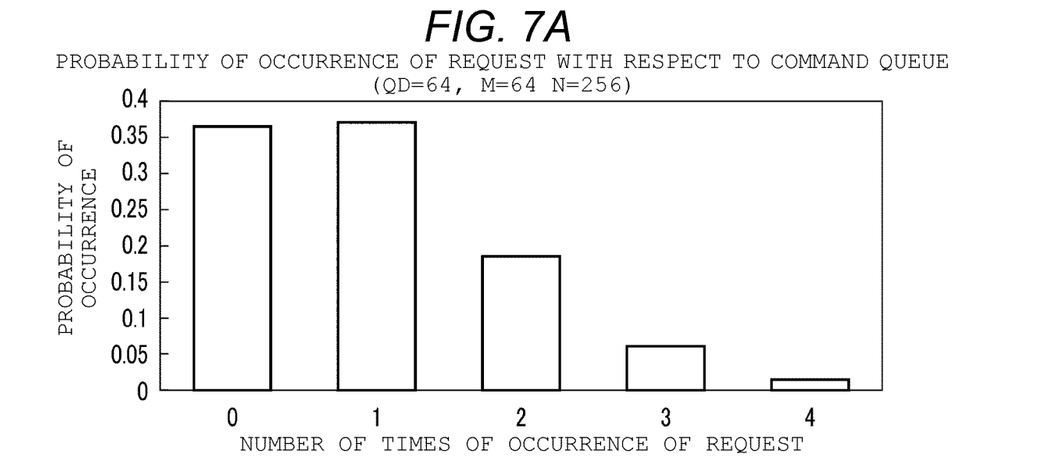
FIG. 7A is a graph showing the probability of occurrence of a request with respect to each command queue in a comparative example.

With such a method, in a case where the number of commands simultaneously issued from the host apparatus 2 QD is 64, the number of command queues 325 M is 64, and the number of memory chips 311 N is 256, for example, four chip numbers are allocated to one command queue. When it is assumed that a request with respect to each command queue is made randomly, the probability of occurrence of a request with respect to each command queue is represented by a binomial distribution of a probability of $1/64$ and the number of trials of 64. FIG. 7A is a graph showing the probability of occurrence of a request with respect to each command queue in a comparative example. FIG. 7A does not illustrate the probability of occurrence regarding the number of times of occurrence of a request being 5 or more. This is because the probability of occurrence regarding the number of times of occurrence of a request being 5 or more is regarded as zero in the presently described demonstrative example.

Even in a case of random access as described above, a deviation may occur in a request in a short period of time when the number of commands issued from the host apparatus 2 is small. In the example of FIG. 7A, a request does not occur with respect to a command queue approximately 35% of the time over the period in which the 64 random requests are made. Therefore, the number of memory chips operated in parallel is approximately $64 \times (1-0.35) \approx 42$. On the other hand, in the example of FIG. 7A, two or more requests occur with respect to a command queue approximately 20% or more of the time. Since requests with respect to four chip numbers are queued to one command queue, two or more requests may include a request with respect to another memory chip 311. These requests with respect to another memory chip 311 may be processed in parallel.

Figure 7B:
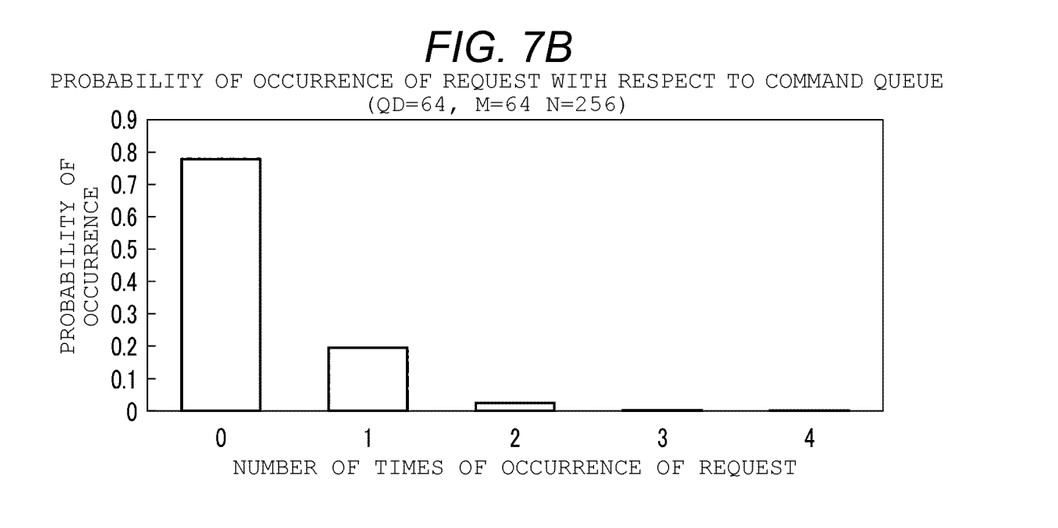
FIG. 7B is a graph showing the probability of occurrence of a request with respect to each command queue according to an embodiment of the present disclosure.

On the other hand, in the method of the embodiment, when the probability of occurrence of a request with respect to each command queue is calculated similar to FIG. 7A, this probability of occurrence is represented by a binomial distribution of a probability of $1/256$ and the number of trials of 64. FIG. 7B is a graph showing the probability of occurrence of a request. FIG. 7B does not illustrate the probability of occurrence regarding the number of times of occurrence of a request being 5 or more. This is because the probability of occurrence regarding the number of times of occurrence of a request being more than or equal to 5 is regarded as zero in the presently described demonstrative example.

In the example of FIG. 7B, a request does not occur with respect to a command queue approximately 78% of the time. Therefore, the number of memory chips operated in parallel is approximately $256 \times (1-0.78) \approx 56$. As is apparent from comparison between FIG. 7A and FIG. 7B, it is possible to increase the number of memory chips operated in parallel by using the method of the embodiment. Thereby, an access throughput in the memory apparatus 3 is improved.

Here, in the embodiment, allocation of a chip number is performed by the MPU 322 of the memory apparatus 3 in a software manner. On the other hand, allocation of a chip number may be performed using a hardware circuit.

Here, in the embodiment, one chip number is allocated to one command queue in a case where allocation of a chip number is performed. This is particularly effective when access from the host apparatus 2 to the memory apparatus 3 is random. When access from the host apparatus 2 to the memory apparatus 3 has a certain deviation instead of being random, one chip number may be allocated to a plurality of command queues in a case where allocation of a chip number is performed. Further, in the embodiment, allocation of a chip number is performed in order of requests from the host apparatus 2. However, allocation of a chip number may not be necessarily performed in order of requests from the host apparatus 2 depending on a tendency of a request from the host apparatus 2.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The different embodiments or features described herein, or portions thereof, may be combined. The accompanying claims and their equivalents are intended to cover such forms or modifications as would fall within the scope and spirit of the present disclosure.

What is claimed is:

1. A memory apparatus comprising:
   a memory device including a first memory chip and a second memory chip; and
   a controller including a first memory and a second memory both configured to be allocated to the first memory chip or the second memory chip and configured to individually store a plurality of commands for an allocated one of the first memory chip and the second memory chip, wherein
   the controller is configured to:
   specify an address of the first memory chip that is to be accessed;
   determine whether or not the first memory chip is allocated to the first memory and to the second memory, responsive to the address;
   select one of the first memory and the second memory to which neither the first memory chip nor the second memory chip is allocated, responsive to determining that the first memory chip is not allocated to the first memory and is not allocated to the second memory;
   allocate the first memory chip to the selected one of the first memory and the second memory;
   enqueue the command into the one of the first memory and the second memory to which the first memory chip is allocated; and
   dequeue the command from the one of the first memory and the second memory to which the first memory chip is allocated, responsive to completion of executing the command.

2. The memory apparatus according to claim 1, wherein the controller is further configured to:
   determine that the first memory chip is allocated to the selected one of the first memory and the second memory, and to responsively enqueue the command corresponding to the access request received from the host apparatus to the first memory or the second memory to which the first memory chip is allocated.

3. The memory apparatus according to claim 1, wherein the controller is configured to set the first memory or the second memory to which the first memory chip is allocated to a state where the first memory chip is not allocated, responsive to determining no commands remain enqueued in the first memory or the second memory to which the first memory chip is allocated.

4. The memory apparatus according to claim 1, wherein the controller is configured to manage a relationship of allocation between the first memory chip and the second memory chip to the first memory and the second memory by using a table.

5. The memory apparatus according to claim 4, wherein the table indicates, for each of the first memory and the second memory, which one or more of the memory chips are allocated to the memory, or indicates that no memory chip is allocated to the memory.

6. The memory apparatus according to claim 1, wherein the first memory and the second memory constitute at least a portion of one or more first-in-first-out (FIFO) type storage apparatuses.

7. The memory apparatus according to claim 1, wherein the controller is configured to determine that both the first memory and the second memory are not allocated to the first memory chip and are not allocated to the second memory chip, and to responsively allocate the first memory chip to both the first memory and the second memory.

8. A control method for a memory apparatus configured to control a memory device including a first memory chip and a second memory chip using a first memory and a second memory, the first and second memories both being configured to be allocated to the first memory chip or the second memory chip and configured to individually store a plurality of commands for an allocated one of the first memory chip and the second memory chip, the control method comprising:
   specifying an address of the first memory chip that is to be accessed;
   determining whether or not the first memory chip is allocated to the first memory and to the second memory, responsive to the address;
   selecting one of the first memory and the second memory to which neither the first memory chip nor the second memory chip is allocated responsive to determining that the first memory chip is not allocated to the first memory and is not allocated to the second memory;
   allocating the first memory chip to the selected one of the first memory and the second memory;
   enqueueing the command into the one of the first memory and the second memory to which the first memory chip is allocated; and
   dequeueing the command from the one of the first memory or the second memory to which the first memory chip was allocated, responsive to completion of executing the command.

9. The control method according to claim 8, further comprising determining that the first memory chip is allocated to the selected one of the first memory and the second memory, and responsively enqueueing the command corresponding to the access request received from the host apparatus to the first memory or the second memory to which the first memory chip is allocated.

10. The control method according to claim 8, further comprising setting the first memory or the second memory to which the first memory chip is allocated to a state where the first memory chip is not allocated, responsive to determining no commands remain enqueued in the first memory or the second memory to which the first memory chip is allocated.

11. The control method according to claim 8, further comprising managing a relationship of allocation between the first memory chip and the second memory chip to the first memory and the second memory by using a table.

12. The control method according to claim 11, wherein the table indicates, for each of the first memory and the second memory, which one or more of the memory chips are allocated to the memory, or indicates that no memory chip is allocated to the memory.

13. The control method according to claim 8, wherein the first memory and the second memory constitute at least a portion of one or more first-in-first-out (FIFO) type storage apparatuses.

14. The control method according to claim 8, wherein the controller is configured to determine that both the first memory and the second memory are not allocated to the first memory chip and are not allocated to the second memory chip, and to responsively allocate the first memory chip to both the first memory and the second memory.

15. A memory apparatus comprising:
   a memory device including a plurality of memory chips; and
   a controller including a memory comprising a plurality of command queues, the command queues being configured to be allocated to any of the plurality of memory chips and configured to individually store a plurality of commands for an allocated one of the plurality of memory chips, wherein
   the controller is configured to:
   receive a first command from a host apparatus designating a first logical address;
   specify a first physical address corresponding to the first logical address, the physical address being an address of a first memory chip of the plurality of memory chips;
   determine that the first memory chip is not allocated to any of the plurality of command queues, and allocate the first memory chip that is to be accessed to a first command queue of the plurality of command queues, responsive to receiving a request indicating the address of the first memory chip;
   enqueue the first command into the first command queue to which the first memory chip is allocated; and
   dequeue the command from the one of the first memory or the second memory to which the first memory chip was allocated, responsive to completion of executing the command.

16. The memory apparatus of claim 15, wherein the controller is further configured to:
   process the first command in the first command queue;
   determine that the first command queue has no commands queued; and
   responsively set a state of the first command queue to a state in which none of plurality of memory chips are allocated to the first command queue.

17. The memory apparatus of claim 16, wherein the controller is further configured to:
   receive a second command from the host apparatus specifying the first logical address;
   determine the first physical address corresponding to the first logical address, the first physical address being the address of the first memory chip of the plurality of memory chips;
   determine that the first memory chip is not allocated to any of the command queues of the plurality of command queues;
   determine that the first command queue is in the state in which none of plurality of memory chips are allocated to the first command queue;
   responsively allocate the first memory chip to the first command queue; and
   enqueue the second command in the first command queue to which the first memory chip is allocated.

18. The memory apparatus of claim 16, wherein the controller is further configured to set the state of the first command queue in a table.

19. The memory apparatus of claim 15, wherein the controller is further configured to:
   receive a second command from the host apparatus specifying a second logical address;
   determine a second physical address corresponding to the second logical address, the second physical address being an address of a second memory chip of the plurality of memory chips;
   determine that the second memory chip is allocated to a second command queue of the plurality of command queues; and
   enqueue the second command in the second command queue to which the second memory chip is allocated.

20. The memory apparatus of claim 15, wherein the plurality of command queues are each respectively first-in-first-out (FIFO) memories.

* * * * *